(12) United States Patent
Shinozawa

(10) Patent No.: US 7,684,124 B2
(45) Date of Patent: Mar. 23, 2010

(54) OPTICAL ELEMENT AND OPTICAL UNIT

(75) Inventor: Yohei Shinozawa, Saitama (JP)

(73) Assignee: Fujinon Corporation, Saitama shi, Saitama (JP)

( * ) Notice: Subject to any disclaimer, the term of this patent is extended or adjusted under 35 U.S.C. 154(b) by 65 days.

(21) Appl. No.: 11/958,245

(22) Filed: Dec. 17, 2007

(65) Prior Publication Data

US 2008/0170297 A1    Jul. 17, 2008

(30) Foreign Application Priority Data

Jan. 17, 2007    (JP)    ............... P2007-008518

(51) Int. Cl.
  *G02B 9/00*    (2006.01)
  *G02B 9/08*    (2006.01)
(52) U.S. Cl. .................... 359/738; 359/796
(58) Field of Classification Search .......... 359/738, 359/796, 797, 811
  See application file for complete search history.

(56) References Cited

U.S. PATENT DOCUMENTS 5,078,773 A    1/1992    Thomas

| | | |
|---|---|---|
| 2003/0099045 A1 | 5/2003 | Doi |
| 2005/0123238 A1 | 6/2005 | Ito |
| 2005/0226608 A1 | 10/2005 | Kwon et al. |
| 2005/0264895 A1 | 12/2005 | Chao |
| 2008/0186592 A1 * | 8/2008 | Sakaki ............ 359/707 |

FOREIGN PATENT DOCUMENTS

| | | | |
|---|---|---|---|
| EP | 1947495 A1 * | 7/2008 | |
| JP | 2002-303703 A | 10/2002 | |
| WO | WO-2004/005977 A1 | 1/2004 | |

* cited by examiner

*Primary Examiner*—David N Spector
(74) *Attorney, Agent, or Firm*—Birch, Stewart, Kolasch & Birch, LLP

(57) ABSTRACT

An optical unit includes one or more optical elements. At least one 40 of the optical elements has: an optical functional surface, that refracts incident light, within an effective diameter; and a rough surface 49 formed on an optical functional surface 42*b* that is formed outside the effective diameter and that scatters the incident light which has been internally reflected. With this configuration, light which is incident on the optical element and which may generate flare or the like when it is internally reflected by the optical functional surface outside the effective diameter is scattered by the rough surface formed on the optical functional surface outside the effective diameter. Therefore, generation of the flare or the like is suppressed. Also, since the optical unit is constituted by such an optical element having the rough surface, generation of the flare or the like is suppressed.

7 Claims, 2 Drawing Sheets

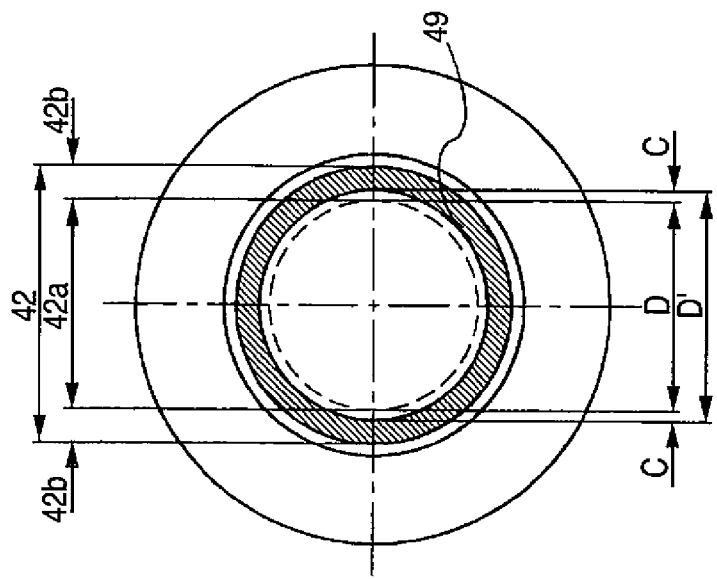
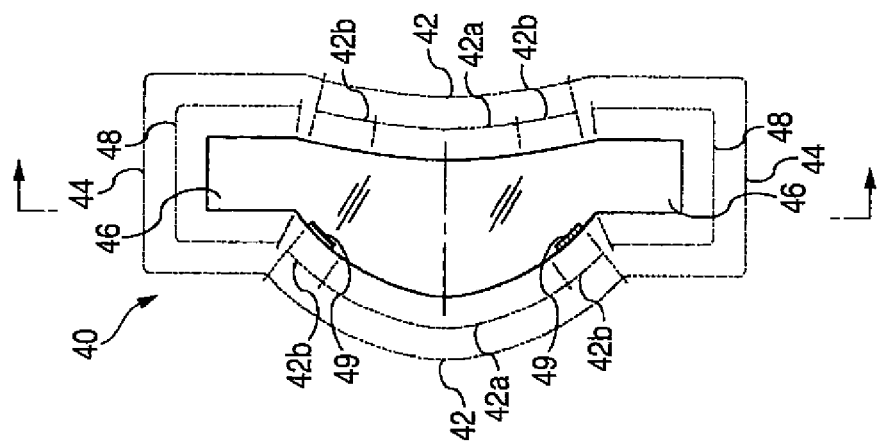
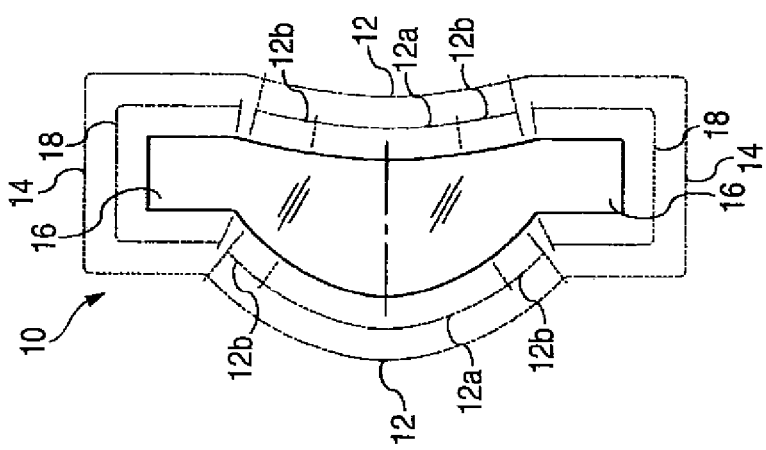

OPTICAL ELEMENT AND OPTICAL UNIT

CROSS-REFERENCE TO RELATED APPLICATIONS

This application is based upon and claims the benefit of priority from the Japanese Patent Application No. 2007-8518 filed on Jan. 17, 2007; the entire contents of which are incorporated herein by reference.

BACKGROUND OF THE INVENTION

1. Technical Field

The invention relates to an optical element and an optical unit.

2. Description of the Related Art

Various optical lenses for use in an optical unit have been developed in accordance with reduction of the optical unit in size and weight and multiple functions of the optical unit. For example, in an optical unit for use in a cellular phone having a camera function or a vehicle rear-view monitor, wide-angle lenses having a view angle equal to or larger than a view angle (about 45 to 50 degrees) of a standard lens are frequently used. Particularly, in an optical unit for use in a cellular phone, optical lenses having wide view angels, which have not been used conventionally, are used as the cellular phones becomes thin.

Accordingly, there is the case where unintended light having an incidence angle larger than that of a general wide-angle lens is incident on the optical lens and is reflected inside the optical lens, the optical unit, and the like. As a result, flare, ghost, or the like may be generated. When the flare is generated, the contrast of the original image is reduced or colors in a color picture become dull due to light that does not contribute to image formation. Also, when the ghost is generated, a false image or multiple images of an object are observed through the optical unit due to light that contributes to image formation.

Since a processing accuracy required for an optical lens is improved, when an surface located on the outer side with respect to an optical functional surface of an optical lens is processed with the same degree in accuracy as that for the optical functional surface, internal reflection of the light incident on the optical lens is enhanced, which is one cause of generation of the flare or the like. The optical functional surface of the optical lens represents a range, up to an outer side, including a range of an effective diameter (diameter, in a section perpendicular to an optical axis, of a bundle of parallel light, which comes from a point at infinity on the optical axis and passes the optical lens) of the optical lens. It is difficult to process an optical lens in accordance with a designed shape for implementing the function of the optical lens, in a molding process only for the range of the effective diameter. Therefore, the optical functional surface means a range which is molded in accordance with a predetermined designed shape for implementing a function as an optical lens as well as the range of the effective diameter. Generally, similarly to a portion within the effective diameter, a portion of the optical functional surface outside the effective diameter is molded to have a shape and surface accuracy that can provide a predetermined optical function by refracting incident light.

In order to solve these problems, for example, JP 2002-303703 A discloses the following solutions: As a first solving method, JP 2002-303703 A proposes blocking light so as not to enter through a portion shielded by a light shielding plate or a concave surface by making the light shielding plate that surrounds a lens surface to protrude toward a front side of the lens surface or by providing the optical lens within the concave surface that surrounds the lens surface. Also, as a second solving method, JP 2002-303703 A proposes blocking light so as not to enter through a portion in which a light shielding film is formed, by forming the light shielding film in a portion of the lens surface where light shielding is required. Furthermore, as a third solving method, JP 2002-303703 A proposes, when it is applied to a lens array, blocking light so as not to enter through a portion where a rough surface portion is formed, by forming the rough surface portion in a lens adjacent portion of the optical lens which requires light shielding so that the rough surface portion scatters the light.

However, the first solving method results in that the manufacturing cost increases as an additional component for forming the light shield plate or the concaved part is used while a request for thinning and lightening the optical unit cannot be achieved. Also, the second or third solving method blocks incident light from a portion of the lens surface that requires light shield. However, when light having a large incident angle which is a cause of the flare or the like is incident in the effective diameter of the lens, light originally required for forming an image is blocked as well as unintended light. Accordingly, it is difficult to fully solve these types of problems only by controlling light incident on the optical lens.

Thus, a method for controlling internal reflection of light incident on the optical lens is applied instead of or in addition to controlling of the light incident on the optical lens. For example, it may be conceived that an antireflection film is formed on a surface which reflects the incident light and which includes the optical functional surface. In this case, the antireflection film is formed by printing, film adhesion, deposition or exposure on the surface including the optical functional surface of the optical lens molded by an injection molding method or a press molding method. However, when the printing or the film adhesion is used, an accuracy of the formed reflection film is low and it is difficult to manage its quality. On the other hand, when the deposition or the exposure is used, the manufacturing cost for forming the antireflection film increases. Also, when any of these methods is used, a secondary process after molding of the optical lens is required. Therefore, it is inevitable that manufacturing process becomes complex and that the manufacturing cost increases.

SUMMARY

In view of the above circumstances, the invention has been made and provides novel and improved optical element and optical unit which can suppress generation of flare or the like.

In order to solve the above object, according to an aspect of the invention, an optical element includes an optical functional surface and a rough surface. The optical functional surface includes a part within an effective diameter of the optical element. The part refracts incident light. The rough surface is formed on another part of the optical functional surface outside the effective diameter of the optical element. The other part scatters the incident light which has been internally reflected. With this configuration, light which is incident on the optical element and which may generate flare or the like when it is internally reflected by the other part of the optical functional surface outside the effective diameter is scattered by the rough surface formed on the other part of the optical functional surface outside the effective diameter. Therefore, generation of the flare or the like is suppressed. That is, the other part of the optical functional surface outside the effective diameter dares to be made rough, to thereby form, on the optical functional surface, a surface for scattering the light.

Also, the rough surface may be formed to have a ten-point mean roughness in a range of from 4 µm to 25 µm. With this configuration, the rough surface having sufficient roughness is formed on the other part of the optical functional surface outside the effective diameter. Therefore, the light internally reflected by the other part of the optical functional surface outside the effective diameter is sufficiently scattered by the rough surface.

Also, the optical element may be made of glass. With this configuration, the optical element made of glass in which generation of flare of the like is suppressed is formed.

Also, the optical element may be made of plastic. With this configuration, the optical element made of plastic in which generation of flare or the like is suppressed is formed.

According to another aspect of the invention, an optical unit includes one or more optical elements. At least one of the one or more optical elements has an optical functional surface and a rough surface. The optical functional surface includes a part within an effective diameter of the optical element. The part refracts incident light. The rough surface is formed on another part of the optical functional surface outside the effective diameter of the optical element. The other part scatters the incident light which has been internally reflected. With this configuration, light which is incident on the optical element and which may generate flare or the like when it is internally reflected by the other part of the optical functional surface outside the effective diameter is scattered by the rough surface formed on the other part of the optical functional surface outside the effective diameter. Thereby, generation of the flare or the like is suppressed. In addition, since the optical unit is constituted by the optical element having the rough surfacer generation of the flare or the like is suppressed.

As described above, according to any of the above configurations, an optical element and an optical unit that can suppress generation of flare or the like can be provided.

BRIEF DESCRIPTION OF THE DRAWINGS

FIG. 2 is an enlarged section view showing optical elements shown in FIG. 1.

DETAILED DESCRIPTION OF EMBODIMENT(S) OF THE INVENTION

Figure 1:
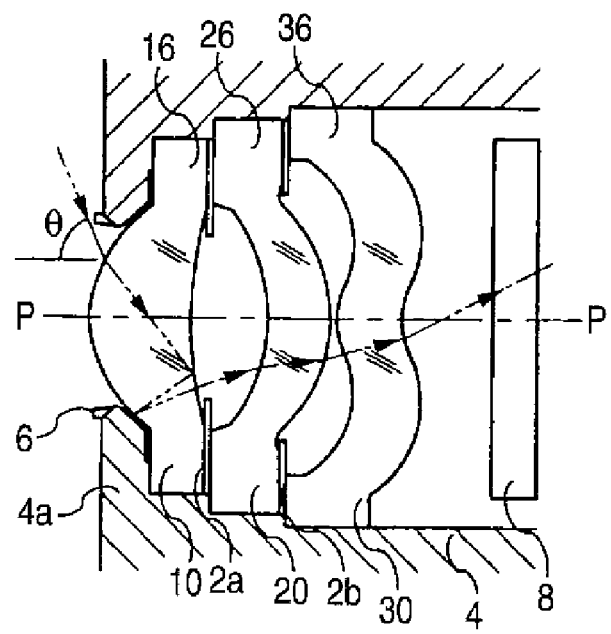
FIG. 1 is a section view showing a main portion of an optical unit according to an embodiment of the invention.
Figure 1:
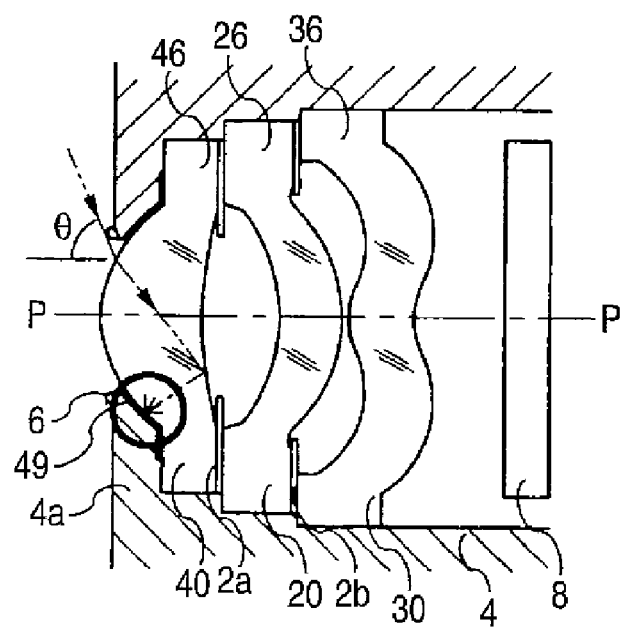

Hereinafter, exemplary embodiments of the invention will be described in detail with reference to the accompanying drawings. In the specification and drawings, like reference numerals in the drawings denote like elements, and thus a duplicate description thereon will be omitted.

An optical unit according to an embodiment of the invention will now be described. FIG. 1 is a section view showing a main portion of the optical unit according to an embodiment of the invention. FIG. 1(a) shows the case where flare or the like is generated due to incidence of unintended light. FIG. 1(b) shows the case where the generation of flare or the like is suppressed by forming a rough surface on a part of an optical functional surface outside an effective diameter of an optical element. FIG. 2 is an enlarged section view showing optical elements shown in FIG. 1. FIGS. 2(a) and 2(b) show first optical elements 10, 40 shown in FIG. 1, respectively. Also, FIG. 2(b) shows a plan view of the first optical element 40 together.

As shown in FIG. 1, the optical unit according to this embodiment includes the first optical element 10, 10 having a flange part 16, 46, the second optical element 20 having a flange part 26, and the third optical element 30 having a flange part 36. The first, second, and third optical elements 10, 40, 20, 30 are held by a holding part 4 of the optical unit with diaphragm plates 2a and 2b interposed therebetween, so that the first, second, and third optical elements 10, 40, 20, 30 have a common optical axis P. A diaphragm part 4a is formed on a front side of the first optical element 10, 40 so as to surround lens surfaces 12b and 18 outside the effective diameter. A light shield plate 6 is formed on an edge of an opening of the diaphragm part 4a, so as to protrude. The light shield plate 6 is used for the purpose of blocking incidence of light having a large incidence angle. However, a height of the protrusion is limited in accordance with a request that the optical unit is to be made thin. Also, on the rear side of the third optical element 30, disposed is an imaging device 8 for receiving light passing through the optical elements 10, 40, 20, 30 and for performing photoelectric conversion for the received light.

The optical element 10, 20, 30, 40, for example, the first optical element 10, as shown in FIG. 2(a), has an optical functional surface 12 and a surface 14 which includes a surface of the flange part 18 and which is located on an outer side with respect to the optical functional surface. Also, the optical functional surface 12 includes a part 12a of the optical functional surface within the effective diameter of the first optical element 10 and the part 12b of the optical functional surface outside the effective diameter of the first optical element 10. It should be noted that the configuration shown in FIG. 2 is just an example. The invention is not limited thereto.

In FIG. 1(a), a case where the flare or the like is generated due to the first optical element 10 is shown. As shown in FIG. 1(a), light, which has been incident on the first optical element 10, having a large incidence angle (θ) is internally reflected by the portion 12b of the optical functional surface beyond the effective diameter, is emitted from the first optical element 10, and passes through the second and third optical elements 20 and 30. Accordingly, the light internally reflected by the first optical element 10 reaches the imaging device 8, and thereby an effect of the flare, under which the contrast of the original image is reduced or colors in a color picture become dull, occurs.

The optical element is molded by an injection molding method, a press molding method, or the like. The injection molding method is a molding method for molding an optical element from a molding material by respective steps of mold clamping, injection, pressure keeping, cooling, plasticization, and mold opening. In the injection molding method, for example, a desired optical element is molded by tightly clamping a shaping mold under pressure equal to or larger than an injection pressure, injecting a molding material into the shaping mold, maintaining pressure applied to the molding material, and cooling and hardening the molding material. Also, the press molding method is a molding method for molding an optical element from a molding material by using a pair of shaping molds having a transfer surface including an optical functional transfer surface and a body mold in which the shaping mold is inserted. In the press molding method, for example, a desired optical element is molded by placing the molding material in the first shaping mold, transferring the transfer surface by pressing the molding material in the first and second shaping molds with the molding material heated and softened, and cooling the molding material with the transfer maintained. Here, as a molding material for the optical element, a molding material such as glass or plastic is used.

A rough surface 49 is formed on a part of the optical functional surface outside the effective diameter in at least one of the optical elements forming the optical unit according to this embodiment. Also, in the first optical element 40 that was made for the purpose of a trial by applicants, a rough surface 49 is formed on the whole circumference of the part 42b of the optical functional surface outside the effective diameter so that its inner diameter D' is formed to be about 1.65 mm while the effective diameter D is 1.55 mm, that is, so as to have a clearance of 0.10 mm between the rough surface 49 and the effective diameter D.

The roughness of the rough surface is determined based on a degree of flare generation before the rough surface is provided, a required degree of flare suppression, an arrangement error, and the like. It is preferable that the rough surface 49 is formed to have a ten-point mean roughness (Rz) in the range of from 4 µm to 25 µm. Thereby, since the rough surfaces 49 having sufficient roughness are formed on the part of the optical functional surface 42b outside the effective diameter, light internally reflected by the part 42b of the optical functional surface outside the effective diameter is sufficiently scattered. In a process for preparing a shaping mold, the rough surface 49 is formed in advance on a corresponding transfer surface of the shaping mold. The rough surface 49 is transferred together with the part 42a of the optical functional surface within the effective diameter during a molding process that employs an injection molding method, a press molding method, or the like. In experiments performed by applicants, it was confirmed that generation of the flare phenomenon was good suppressed by forming the rough surface 49 having this accuracy.

As shown in FIG. 1(*a*), in the case where the flare or the like is generated due to the first optical element 10, the first optical element 40 shown in FIG. 2(*b*) is used instead of the first optical element 10 (FIG. 2(*a*)). Thereby, generation of the flair or the like is suppressed as shown in FIG. 1(*b*). That is, since light which has a large incidence angle (θ) and which is incident on the first optical element 40 is scattered by the rough surface 49 formed on the part 42b of the optical functional surface outside the effective diameter of the first optical element 40, the light internally reflected by the first optical element 40 does not reach the imaging device 8. As a result, generation of the flare or the like is suppressed. According to experiments performed by the applicants, generation of rainbow-colored flare was observed in the first optical element 10 under conditions that the incident light has an incidence angle of θ=70°. However, flare was not observed in the first optical element 40 in which the rough surface 49 is formed on the part 42b of the optical functional surface outside the effective diameter of the first optical element 40. Also, since a clearance C was provided between the effective diameter D and the inside diameter D' of the rough surface 49, desired performance of the lens was confirmed without incurring any side effect such as a defection of image formation.

The part of the optical functional surface outside the effective diameter of the optical element on which the rough surface is formed is determined based on optical simulation or the like performed in advance. Depending on the result of the optical simulation, rough surfaces may be formed on parts of the optical functional surfaces outside the effective diameter of a plurality of optical elements (for example, the first, second, and third optical elements 10, 20, 30). Alternatively, the rough surfaces may be formed on the whole parts of the optical functional surfaces outside the effective diameter, or may be partially formed on the part of the optical functional surfaces outside the effective diameter.

With the optical unit according to this embodiment, light which is incident on the optical element 40 and which may generate flare or the like when it is internally reflected by the part 42b of the optical functional surface outside the effective diameter of the optical element 40 is scattered by the rough surface 49 formed on the part 42b of the optical functional surface outside the effective diameter. Thereby, generation of the flare or the like is suppressed. Also, the optical unit is formed of the optical element 40 in which the rough surface 49 is formed. Accordingly, the generation of the flare or the like in the optical unit is suppressed. Therefore, there can be provided an optical unit capable of suppressing the generation of the flare or the like without requiring a secondary process performed after the optical lens is molded and without requiring a complex manufacturing process or increasing the manufacturing cost.

The exemplary embodiments of the invention have been described with reference to the accompanying drawings. However, the invention is not limited thereto. It is apparent that one skilled in the art would achieve various changes or modifications within the scope of claims. Those changes or modifications should be construed as belonging to the technical scope of the invention.

For example, in the description of the embodiments, described is the case where the rough surface is formed on the part of the optical functional surface outside the effective diameter of the optical element. The invention is not limited thereto. For example, the invention may be similarly applied to the case where the rough surface is formed on a surface which includes the flange surface and which is located on an outer side with respect to the optical functional surface.

What is claimed is:

1. An optical element comprising:
   an optical functional surface including a part within an effective diameter of the optical element, the part that refracts incident light; and
   a rough surface formed in the optical functional surface outside the effective diameter of the optical element, an other part that scatters the incident light which has been internally reflected.

2. The optical element according to claim 1, wherein the rough surface is formed to have a ten-point mean roughness in a range of from 4 µm to 25 µm.

3. The optical element according to claim 1, wherein the optical element is made of glass.

4. The optical element according to claim 2, wherein the optical element is made of glass.

5. The optical element according to claim 1, wherein the optical element is made of plastic.

6. The optical element according to claim 2, wherein the optical element is made of plastic.

7. An optical unit comprising one or more optical elements, wherein
   at least one of the one or more optical elements has
      an optical functional surface including a part within an effective diameter of the optical element, the part that refracts incident light; and
      a rough surface formed in the optical functional surface outside the effective diameter of the optical element, an other part that scatters the incident light which has been internally reflected.

* * * * *